(12) United States Patent
Yoshida

(10) Patent No.: US 6,171,989 B1
(45) Date of Patent: *Jan. 9, 2001

(54) SILVER-COLORED SINTERED PRODUCT AND METHOD OF PRODUCING THE SAME

(75) Inventor: Nobuo Yoshida, Kokubu (JP)

(73) Assignee: Kyocera Corporation, Kyoto (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/878,582

(22) Filed: Jun. 19, 1997

Related U.S. Application Data

(63) Continuation of application No. 08/469,244, filed on Jun. 6, 1995, now abandoned.

(30) Foreign Application Priority Data

| Sep. 29, 1994 | (JP) | 6-234867 |
| Nov. 30, 1994 | (JP) | 6-296381 |
| Nov. 30, 1994 | (JP) | 6-296382 |
| Dec. 26, 1994 | (JP) | 6-322551 |

(51) Int. Cl.$^7$ ............................. C04B 35/58; C04B 35/56
(52) U.S. Cl. .................. 501/93; 501/96.1; 501/96.3; 501/102; 419/12; 419/15
(58) Field of Search ................ 419/12, 14, 15, 419/16; 501/87, 96.1, 96.3, 102, 93

(56) References Cited

U.S. PATENT DOCUMENTS

| 2,084,349 | * | 6/1937 | Laise | 419/12 |
| 2,581,252 | * | 1/1952 | Goetzel et al. | 419/14 |
| 3,380,856 | * | 4/1968 | Pohl | 419/12 |
| 3,669,695 | * | 6/1972 | Iler et al. | 419/12 |
| 4,731,115 | * | 3/1988 | Abkowitz et al. | 419/17 |
| 4,968,348 | * | 11/1990 | Abkowitz et al. | 419/12 |
| 5,256,368 | * | 10/1993 | Oden et al. | 419/12 |
| 5,403,790 | * | 4/1995 | Claar et al. | 419/12 |
| 5,641,921 | * | 6/1997 | Dennis et al. | 419/12 |

FOREIGN PATENT DOCUMENTS

| 58-27975 | 2/1983 | (JP) . |
| 59-18458 | 4/1984 | (JP) . |
| 61-270265 | 11/1986 | (JP) . |
| 5-294739 | 11/1993 | (JP) . |

* cited by examiner

Primary Examiner—Jan H. Silbaugh
Assistant Examiner—Kenneth M. Jones
(74) Attorney, Agent, or Firm—Hogan & Hartson, LLP

(57) ABSTRACT

A silver-colored sintered product having excellent corrosion resistance containing titanium, carbon and boron as indispensable constituent elements, and including in the sintered product composition a titanium boride phase or a boride phase which contains titanium as a chief metal element and a titanium carbide phase or a carbide phase which contains titanium as a chief metal element and a method of producing the same. The sintered product has a flexural strength of not smaller than 700 MPa, a Vickers' hardness of not smaller than 9.0 GPa and a fracture toughness of not smaller than 5.0 MPa·m$^{1/2}$.

13 Claims, 1 Drawing Sheet

SILVER-COLORED SINTERED PRODUCT AND METHOD OF PRODUCING THE SAME

This is a continuation of application Ser. No. 08/469,244 filed on Jun. 6, 1995, now abandoned.

BACKGROUND OF THE INVENTION

1. Field of the Invention

The present invention relates to a silver-colored sintered product used for ornamental articles, tools, sliding members, blades for industrial use, stamps, spectacle frames, tablewares, and sporting goods such as pins of shoes, golf clubs, etc. and to a method of producing the same. In particular, the invention relates to a silver-colored sintered product having large strength, high hardness, resistance against chipping, excellent resistance against corrosion and excellent ornamental property that can be used as ornamental materials such as frames for timepieces, necktie pins, bracelets, pierced earrings, earrings, and fishing goods, and to a method of producing the same.

2. Description of the Prior Art

Ornamental parts such as armoring parts for timepieces and the like must have good corrosion resistance, increased resistance against scratching, and long-lasting metallic luster. As materials having metallic luster that are best suited for use as ornamental parts, there have been used a stainless steel and carbides of metals such as sintered alloys obtained by bonding WC and TiC with such metals as Ni and Co.

The stainless steel has an excellent corrosion resistance but has a low hardness and is subject to be scratched. The sintered alloys comprising chiefly WC and TiC and bonded with metal elements such as Ni and Co, have no problem in regard to the hardness but have a low corrosion resistance against the human sweat and sea water.

In recent years, $TiB_2$ sintered products which are borides of titanium having high hardness and excellent corrosion resistance have been developed and placed in practical use (see, for example, Japanese Laid-Open Patent Publication No. 27975/1983, Japanese Patent Publication No. 18458/1984, Japanese Laid-Open Patent Publications Nos. 270265/1986 and 294739/1993).

These $TiB_2$ sintered products have a flexural strength of from 800 to 1000 MPa, Vickers' hardness of from 18 to 24 GPa, fracture toughness of from 4 to 7 $MPa\cdot m^{1/2}$ and excellent corrosion strength.

However, the above-mentioned $TiB_2$ sintered products must be sintered at a temperature of as high as from 1600 to 2000° C.; i.e., sinterability is poor.

SUMMARY OF THE INVENTION

The object of the present invention is to provide a silver-colored sintered product having excellent properties such as hardness, corrosion resistance, etc. which are comparable with those of the $TiB_2$ sintered product, and can be sintered at a temperature of as low as from 1300 to 1600° C., and a method of producing the same.

Another object of the present invention is to provide a silver-colored sintered product for ornamental parts, which, when it is used as an ornamental article, does not cause the user to develop metal allergy.

According to the present invention, there is provided a silver-colored sintered product containing at least titanium, carbon and boron as constituent elements and having excellent corrosion resistance, a flexural strength of not smaller than 700 MPa, a Vickers' hardness of not smaller 9.0 GPa and a fracture toughness of not smaller than 5.0 $MPa\cdot m^{1/2}$, the sintered product including in the composition thereof a metal boride phase represented by the following composition formula (I) and a metal carbide phase represented by the following composition formula (II), $$(Ti_a M_b)B_c, \quad (I)$$

$$(Ti_x N_y)C_z, \quad (II)$$

wherein M and N denote, respectively, at least one of the elements selected from the elements of the Groups 4a, 5a and 6a of periodic table but excluding Ti, and a, b, c, x, y and z satisfy the following relations:
$0.8 \leq a \leq 1.0$
$0 \leq b \leq 0.2$
$0.8 \leq c \leq 1.0$
$a+b=1$
$0.8 \leq x \leq 1.0$
$0 \leq y \leq 0.2$
$0.6 \leq z \leq 1.0$
$x+y=1$ According to an embodiment of the present invention, there is provided a silver-colored sintered product comprising, as metal element components, a boride phase composed chiefly of titanium, a carbide phase composed chiefly of titanium, and the remainder being a metal phase composed chiefly of titanium and unavoidable impurities, wherein when the composition formulas of said boride and said carbide based upon their atomic ratios are expressed as, $$(Ti_a M_b)B_c,$$

$$(Ti_x N_y)C_z$$

wherein M and N denote, respectively, at least one of the elements selected from the elements of the Groups 4a, 5a and 6a of periodic table but excluding Ti, a, b, c, x, y and z satisfy the following relations:
$0.8 \leq a \leq 1.0$
$0 \leq b \leq 0.2$
$0.8 \leq c \leq 1.0$
$a+b=1$
$0.8 \leq x \leq 1.0$
$0 \leq y \leq 0.2$
$0.6 \leq z \leq 1.0$
$x+y=1$ The sintered product of this embodiment has excellent strength, hardness, resistance against chipping, corrosion resistance, favorable sinterability, and exhibits silver-colored mirror plane.

According to a second embodiment of the present invention, there is provided a silver-colored sintered product comprising titanium in an amount of from 80 to 95% by weight, boron in an amount of from 3 to 12% by weight and carbon in an amount of from 2 to 8% by weight per the whole amount of titanium, carbon and boron which are the constituent elements, the sintered product including a TiC phase and a TiB phase together, as well as a silver-colored sintered product containing elements of the Groups 4a, 5a and 6a of periodic table but excluding Ti in amounts of from 0.5 to 20.0 parts by weight per 100 parts by weight of the three chief components of from 80 to 95% by weight of titanium, from 3 to 12% by weight of boron and from 2 to 8% by weight of carbon, said sintered product including a TiC phase and a TiB phase together.

These sintered products, too, have excellent strength, hardness, resistance against chipping, corrosion resistance and sinterability.

According to the present invention, furthermore, there is provided a silver-colored sintered product of the above-mentioned second embodiment wherein the contents of metals that may serve as a cause of allergy are suppressed to be not larger than 0.3% by weight per the whole amount of the sintered product.

The sintered product has excellent strength, hardness, resistance against chipping, corrosion resistance and sinterability as described above. Moreover, even when ornamental articles made of this sintered product are worn by men, they do not become a cause of allergy to men.

According to the present invention, there is further provided a method of producing a silver-colored sintered product by molding a mixture of a powder of titanium, a powder of a carbide of titanium and a powder of a boride of titanium, into an article of a predetermined shape, and firing the molded article in a non-oxidizing atmosphere at a temperature of from 1300 to 1600° C.

DETAILED DESCRIPTION OF THE PREFERRED EMBODIMENTS

Figure 1:
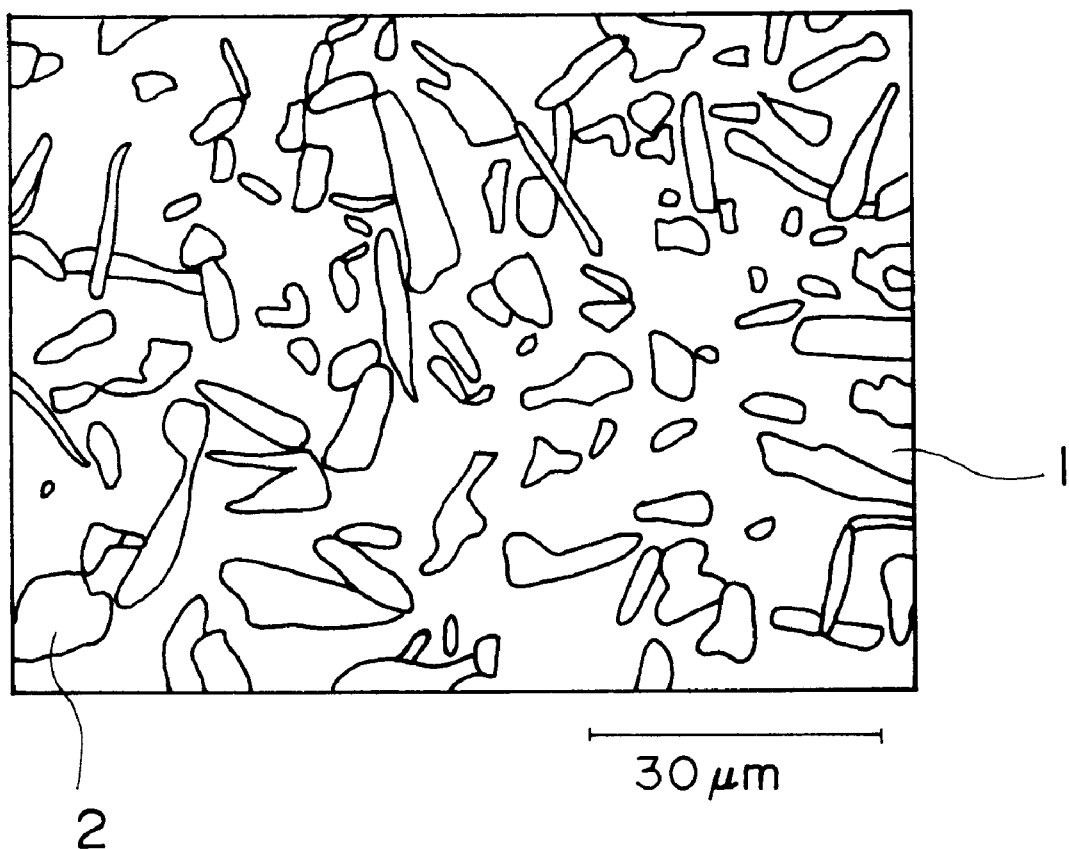
FIG. 1 is a diagram illustrating the structure of a silver-colored sintered product according to a second embodiment of the present invention as observed using a SEM (scanning electron microscope).

The silver-colored sintered product of the present invention contains at least titanium, carbon and boron as essential constituent elements, and has a structure which includes a titanium boride phase or a boride phase composed chiefly of titanium as a metal component and a titanium carbide phase or a carbide phase composed chiefly of titanium as a metal component.

In the silver-colored sintered product of the present invention, the titanium carbide phase or the carbide phase composed chiefly of titanium as a metal component in the sintered product contributes to imparting silver color, and the titanium boride phase or the boride phase composed chiefly of titanium as a metal component contributes to improving mechanical properties such as flexural strength, Vickers' hardness and fracture toughness.

Another feature is that the sintered product of the present invention is obtained through the firing at a temperature which is as relatively low as from 1300 to 1600° C.

According to the first embodiment of the present invention, the silver-colored sintered product comprises a boride containing titanium and a carbide containing titanium, the remainder being a metal phase composed chiefly of titanium and unavoidable impurities, wherein when the composition formulas of the boride and the carbide based upon their atomic ratios are expressed as $(Ti_aM_b)B_c$ and $(Ti_xN_y)C_z$ (wherein M and N are, respectively, at least one of the elements selected from the elements of the Groups 4a, 5a and 6a of periodic table but excluding Ti), a, b, c, x, y and z satisfy the following relations, i.e., $0.8 \leq a \leq 1.0$, $0 \leq b \leq 0.2$, $0.8 \leq c \leq 1.0$, $a+b=1$, $0.8 \leq x \leq 1.0$, $0 \leq y \leq 0.2$, $0.6 \leq z \leq 1.0$ and $x+y=1$.

Mentioned below are the reasons why the sintered product of the embodiment of the present invention are limited as described above.

It is desired that the total amount of the boride containing Ti (hereinafter referred to as Ti boride) and the carbide containing Ti (hereinafter referred to as Ti carbide) is not smaller than 60% by weight. When this amount is smaller than 60% by weight, the amount of the hard phase in the sintered product decreases and the hardness decreases. It is particularly desired that the total amount of the Ti carbide and the Ti boride is not smaller than 70% by weight.

The atomic ratio of Ti in the Ti boride is selected to be $0.8 \leq a \leq 1.0$, i.e., the atomic ratio of the metal M is selected to be $0 \leq b \leq 0.2$. This is because, when the atomic ratio a of Ti is smaller than 0.8 (atomic ratio of the metal M is larger than 0.2), the sinterability is impaired and the strength decreases, too. It is desired that the atomic ratio of Ti in the Ti boride is $0.85 \leq a \leq 0.95$, i.e., the atomic ratio of the metal M is $0.05 \leq b \leq 0.15$.

Furthermore, the atomic ratio c of boron in the Ti boride is selected to be $0.8 \leq c \leq 1.0$. This is because, when the atomic ratio c of boron is smaller than 0.8, the sinterability is impaired and voids develop. When the atomic ratio c is larger than 1.0, on the other hand, the strength decreases due to free boron. It is desired that the atomic ratio c of boron in the Ti boride is $0.9 \leq c \leq 1.0$.

The atomic ratio x of Ti in the Ti carbide is selected to be $0.8 \leq x \leq 1.0$, i.e., the atomic ratio of the metal N is selected to be $0 \leq y \leq 0.2$. This is because, when the atomic ratio x of Ti is smaller than 0.8 (atomic ratio of the metal N is larger than 0.2), the sinterability is impaired and the strength decreases. It is desired that the atomic ratio x of Ti in the Ti carbide is $0.80 \leq x \leq 0.95$, i.e., the atomic ratio of the metal N is $0.05 \leq y \leq 0.20$ and, particularly, that $0.90 \leq x \leq 0.95$ and $0.05 \leq y \leq 0.10$.

The atomic ratio z of carbon in the Ti carbide is selected to be $0.6 \leq z \leq 1.0$. This is because, when the atomic ratio z is smaller than 0.6, the sinterability is impaired and voids develop and when the atomic ratio z is larger than 1.0, the strength is lost due to liberated carbon. It is desired that the atomic ratio z of carbon in the Ti carbide is $0.7 \leq z \leq 0.9$.

Here, M or N is at least one of the elements (excluding Ti) of the Groups 4a, 5a and 6a of periodic table. By solid-dissolving these metals in the Ti boride and in the Ti carbide, it is allowed to improve mechanical properties such as flexural strength, Vickers' hardness, fracture toughness, etc.

Elements of the Group 4a of periodic table include Zr and Hf, elements of the Group 5a of periodic table include V, Nb and Ta, and elements of the Group 6a of periodic table include Cr, Mo and W. As the additives, Mo, Ta and W are most desired.

It is desired that the silver-colored sintered product of the embodiment of the present invention comprises not less than 70% by weight of the Ti boride and the Ti carbide, the remainder being a metal phase composed chiefly of titanium and unavoidable impurities, wherein when the composition formulas of the boride and the carbide based upon their atomic ratios are expressed as $(Ti_aM_b)B_c$ and $(Ti_xN_y)C_z$ (wherein M and N are, respectively, at least one of the elements selected from the elements of the Groups 4a, 5a and 6a of periodic table but excluding Ti), a, b, c, x, y and z satisfy the following relations, i.e., $0.85 \leq a \leq 0.95$, $0.05 \leq b \leq 0.15$, $0.9 \leq c \leq 1.0$, $a+b=1.0$, $0.90 \leq x \leq 0.95$, $0.05 \leq y \leq 0.10$, $0.7 \leq z \leq 0.9$ and $x+y=1$.

The silver-colored sintered product of the present invention includes chiefly the $(Ti_aM_b)B_c$ phase and the $(Ti_xN_y)C_z$ phase, and a metal phase composed chiefly of metal titanium exists on the grain boundaries thereof. The metal phase may include metals M and N.

The silver-colored sintered product of the present invention is obtained by mixing, as starting powders, a titanium powder, a titanium carbide powder and a titanium boride powder, as well as at least one kind of a metal selected from V, Cr, Zr, Nb, Mo, Hf, Ta and W, or a powder of at least one of carbides, borides and nitrides of these metals, pulverizing these powders, adding a binder in a predetermined amount thereto, molding the mixture into an article or a desired shape under a predetermined pressure, removing the binder therefrom in a non-oxidizing atmosphere at a predetermined temperature, and firing the article at a predetermined temperature.

Desirably, the silver-colored sintered product according to the embodiment of the present invention is obtained by weighing a titanium carbide and a titanium boride having particle sizes of from 0.5 to 3.0 µm, a titanium powder having a particle size of from 4 to 300 µm, VC having a particle size of from 1.0 to 10.0 µm, and an $Mo_2C$ powder etc., mixing and pulverizing them in an organic solvent such as acetone, adding an organic binder thereto, and molding the mixture into an article of a desired shape. From the molded article is then removed the binder in a non-oxidizing atmosphere at a predetermined temperature, and the article is fired in a vacuum heating furnace at a predetermined temperature.

Here, the boride of titanium may be either $TiB_2$ or TiB. When $TiB_2$ is used as the starting material, the $TiB_2$ and metal titanium react with each other at 1300 to 1600° C. to form a titanium boride (TiB).

It is desired that the titanium boride exists at least partly in the form of needle-like crystals in the sintered product but needs not necessarily exist in the form of needle-like crystals. With the TiB particles partly assuming the form of needle-like crystals, it is allowed to further improve toughness of the sintered product.

The firing is carried out in an atmosphere of a degree of vacuum of from $10^{-1}$ to $10^{-5}$ Torr or in a variety of atmospheres under a reduced pressure or without applying pressure at a temperature of from 1300 to 1600° C. It is desired to further execute the hot isostatic pressure firing (HIP) in a non-oxidizing atmosphere under the pressure of 100 to 2000 atms at 1200 to 1400° C. The firing time is usually from 0.5 to 5 hours though it may vary depending upon the size of the sample. After the firing, the surface of the sintered product is polished like a mirror plane using a diamond paste or the like to obtain lustrous silver color.

In the silver-colored sintered product of the present invention, characteristics are not affected by the inclusion of small amounts of impurities, other compounds or metals provided the above-mentioned composition ranges of the present invention are satisfied.

When the silver-colored sintered product of the present invention is used as, for example, an ornamental article which is brought into direct contact with the human skin, it is desired that the elements of the Groups 4a, 5a and 6a of periodic table denoted by M and N are V, Zr, Nb, Mo, Hf, Ta and W. To prevent allergy, furthermore, it is desired that metal impurities (Al, Cr, Mn, Fe, Co, Ni, Cu, Zn, Rh, Pd, Cd, Sn, Sb) which serve as a cause of allergy are contained in amounts of not larger than 0.3% by weight in the sintered product.

In the silver-colored sintered product of the present invention, the phase $(Ti_xN_y)C_z$ in the sintered product contributes to imparting silver color, and the phase $(Ti_aM_b)B_c$ is formed at a low temperature and further contributes to improving mechanical properties such as flexural strength, Vickers' hardness, fracture toughness, etc. According to the present invention, the sintered product is constituted chiefly by the phase $(Ti_aM_b)B_c$ and the phase $(Ti_xN_y)C_z$ and, hence, exhibits lustrous silver color, excellent flexural strength of not smaller than 700 MPa, Vickers' hardness of not smaller than 9.0 GPa and fracture toughness of not smaller than 5.0 $MPa·m^{1/2}$, and is further sintered at a temperature of as low as from 1300 to 1600° C.

Such a silver-colored sintered product can be used as ornamental articles such as timepiece casings, timepiece bands, necklaces, bracelets, etc., as well as for pairs of scissors, blades, fishing gears and as any other tools and machine parts.

The silver-colored sintered product according to the second embodiment of the present invention typically contains titanium, carbon and boron as constituent elements wherein titanium is contained in an amount of from 80 to 95% by weight, boron is contained in an amount of from 3 to 12% by weight and carbon is contained in an amount of from 2 to 8% by weight per the whole amount of the sintered product which includes the TiC phase and the TiB phase together. Here it is desired that the TiB phase is partly in the form of needle-like crystals.

Furthermore, the silver-colored sintered product according to the second embodiment contains elements (excluding Ti) of the Groups 4a, 5a and 6a of periodic table in amounts of from 0.5 to 20.0 parts by weight per 100 parts by weight of the three chief components of from 80 to 95% by weight of titanium, from 3 to 12% by weight of boron and from 2 to 8% by weight of carbon, said sintered product including the TiC phase and the TiB phase together. Here it is desired that the TiB phase is partly in the form of needle-like crystals.

Of the sintered products of the second embodiment, the former silver-colored sintered product is obtained by molding a mixture of a powder of titanium, a powder of a carbide of titanium and a powder of a boride of titanium, into an article of a predetermined shape, and firing the molded article in a non-oxidizing atmosphere at a temperature of from 1300 to 1600° C.

Mentioned below are the reasons why the amounts of titanium, carbon and boron are limited as described above in the silver-colored sintered products of the embodiment of the invention.

First, the amount of titanium is selected to be from 80 to 95% by weight in the whole amount. This is because, when the amount of titanium is smaller than 80% by weight, the sinterability is deteriorated and the sintered product loses strength. When the amount of titanium exceeds 95% by weight, on the other hand, the TiC phase and the TiB phase which are hard phases are no longer allowed to exist together and the sintered product exhibits decreased hardness. It is desired that titanium is contained in an amount of from 85 to 90% by weight in the whole amount. The sintered product may contain titanium partly as a metal. It is desired that the amount of titanium that exists as a metal is not larger than 40% by weight and, particularly, not larger than 30% by weight.

The amount of boron is selected to be from 3 to 12% by weight per the whole amount. This is because, when the amount of boron is smaller than 3% by weight, TiB which is the hard phase fails to exist and the hardness is lost. When the amount of boron exceeds 12% by weight, on the other hand, $TiB_2$ which is a diboride is formed in large amounts and the firing must be carried out at a high temperature. It is desired that boron is contained in an amount of from 4 to 9% by weight per the whole amount.

The amount of carbon is selected to be from 2 to 8% by weight per the whole amount. This is because, when the amount of carbon is smaller than 2% by weight, TiC which is the hard phase fails to exist and the hardness decreases. When the amount of carbon is larger than 8% by weight, on the other hand, carbon remains in the sintered product resulting in a decrease in the sinterability. It is desired that carbon is contained in an amount of from 3 to 6% by weight per the whole amount.

In the siver-colored sintered product of the present invention, the sintered product includes the TiC phase and the TiB phase. Here, it is desired that the TiB phase exists partly in the form of needle-like crystals. This is because, with the TiB particles being partly in the form of needle-like crystals, it is allowed to greatly increase the toughness of the sintered product.

The needle-like crystals include even those poles having large diameters, and it is desired that the TiB particles have an aspect ratio (long diameter/short diameter) of from 1.5 to 10 and a short diameter of from 0.5 to 20 μm. This is because, with the TiB particles having the above-mentioned sizes, it is allowed to greatly improve toughness. When the above-mentioned range is exceeded, however, the sintered product exhibits decreased density. The TiB particles have anisotropic property and, presumably, assume a needle-like crystalline form.

The TiB phase needs be in a needle-like crystalline form only partly. It is desired that the needle-like crystals exist in an amount of not smaller than 20% per the whole amount of the TiB particles from the standpoint of improving toughness. The TiB phase may entirely be in the needle-like crystalline form.

Of the silver-colored sintered products of the second embodiment of the present invention, the sintered product which contains elements (excluding Ti) of the Groups 4a, 5a and 6a of periodic table in addition to the chief components of titanium, carbon and boron, exhibits further improved mechanical properties such as flexural strength, Vickers' hardness and fracture toughness owing to the addition of these elements in predetermined amounts to the above-mentioned chief components.

The amount of addition is selected to be from 0.5 to 20 parts by weight per 100 parts by weight of the above-mentioned chief components. This is because, when the amount of addition of these elements is smaller than 0.5 parts by weight, the mechanical properties are improved little. When the amount of addition of these elements is larger than 20.0 parts by weight, on the other hand, the sinterability is deteriorated and the strength decreases, too. It is desired that the elements of the Groups 4a, 5a and 6a of periodic table exist in amounts of from 2 to 16 parts by weight. Most of these elements of the Groups 4a, 5a and 6a of periodic table solid-dissolve in the TiB phase or in the TiC phase to help improve properties.

Most desirably, the composition contains titanium in an amount of from 85 to 90% by weight, boron in an amount of from 4 to 9% by weight and carbon in an amount of from 3 to 6% by weight, includes chiefly the TiC phase and the TiB phase, and further contains elements (excluding Ti) of the Groups 4a, 5a and 6a of periodic table in amounts of from 2 to 16 parts by weight per 100 parts by weight of the above chief components.

It is further desired that the TiB phase is partly in a needle-like crystalline form.

The sintered product mainly includes the TiC phase and the TiB phase. Metal titanium as well as elements of the Groups 4a, 5a, 6a of periodic table may exist on the grain boundaries thereof. Elements of the Groups 4a, 5a and 6a of periodic table may be solid-dissolved in the TiC phase and in the TiB phase.

Elements of the Group 4a of periodic table include Zr and Hf, elements of the Group 5a of periodic table include V, Nb and Ta, and elements of the Group 6a of periodic table include Cr, Mo and W. As additives, Mo, Ta and W can be used most desirably. When the silver-colored sintered product of the present invention is used as ornamental articles, it is desired that the elements of the Groups 4a, 5a and 6a of periodic table are V, Zr, Nb, Mo, Hf, Ta and W. In order to prevent allergy, furthermore, it is desired that the sintered product contains metal impurities (Al, Cr, Mn, Fe, Co, Ni, Cu, Zn, Rh, Pd, Cd, Sn, Sb) that serve as a cause of allergy in amounts of not larger than 0.3% by weight.

The silver-colored sintered product of the present invention is obtained by, for example, mixing a powder of titanium, a powder of a carbide of titanium and a powder of a boride of titanium as starting powders and, further, mixing one or more of elements of the Groups 4a, 5a and 6a of periodic table or carbides or borides thereof, pulverizing the mixture, adding a binder in a predetermined amount thereto, molding the mixture into an article of a desired shape under a predetermined pressure, and firing the article in a non-oxidizing atmosphere at a predetermined temperature.

Desirably, the silver-colored sintered product of the present invention is obtained by weighing a titanium carbide and a titanium boride having particle sizes of from 0.5 to 3.0 μm, a titanium powder having a particle size of from 5 to 250 μm, and, as required, elements of the Groups 4a, 5a and 6a of periodic table, or carbide, nitride and boride powders thereof having particle sizes of from 1.0 to 10.0 μm, mixing and pulverizing them in an organic solvent such as acetone, adding an organic binder thereto, and molding the mixture into an article of a desired shape. From the molded article is then removed the binder in a non-oxidizing atmosphere at a predetermined temperature, and the article is fired in a vacuum heating furnace at a predetermined temperature.

Here, the boride of titanium may be either $TiB_2$ or TiB. When $TiB_2$ is used as the starting material, the $TiB_2$ and metal titanium react with each other at 1300 to 1600° C. to form TiB.

The firing is carried out in an atmosphere of a degree of vacuum of from $10^{-1}$ to $10^{-5}$ Torr or in a variety of atmospheres under a reduced pressure or without applying pressure at a temperature of from 1300 to 1600° C. When elements of the Groups 4a, 5a and 6a of periodic table, or carbides, nitrides and borides thereof are to be added, it is desired to further execute the hot isostatic pressure firing (HIP) in a non-oxidizing atmosphere under the pressure of 100 to 2000 atms at 1200 to 1400° C. The firing time is usually from 0.5 to 5 hours though it may vary depending upon the size of the sample. After the firing, the surface of the sintered product is polished like a mirror plane using a diamond paste or the like to obtain lustrous silver color.

In the silver-colored sintered product of the present invention, characteristics are not affected by the inclusion of small amounts of impurities, other compounds or metals provided the above-mentioned composition ranges of the present invention are satisfied.

In the silver-colored sintered product of the present invention, the TiC phase in the sintered product contributes to imparting silver color, and the TiB phase contributes to improving mechanical properties such as flexural strength, Vickers' hardness, fracture toughness, etc. According to the present invention, the sintered product is constituted chiefly by the TiC phase and the TiB phase and, hence, exhibits lustrous silver color, excellent flexural strength of not smaller than 700 MPa, Vickers' hardness of not smaller than 9.0 GPa and fracture toughness of not smaller than 5.0 MPa·m$^{1/2}$, and is further sintered at a temperature of as low as from 1300 to 1600° C.

With the TiB phase existing partly in the form of needle-like crystals, furthermore, the fracture toughness is further improved. Elements of the Groups 4a, 5a and 6a of periodic table that are added contribute to further improving mechanical properties such as flexural strength, Vickers' hardness, fracture toughness, etc.

Such a silver-colored sintered product can be used as ornamental articles such as timepiece casings, timepiece bands, necklaces, bracelets, etc., as well as for pairs of scissors, blades, fishing gears and as any other tools and machine parts.

Of the silver-colored sintered products according to the second embodiment of the present invention, it is desired that the one used as ornamental articles that come into contact with the human body such as human skin contains metals that serve as a cause of allergy in amounts of not larger than 0.3% by weight per the whole amount. Concretely speaking, it is desired that metals that serve as a cause of allergy, such as Al, Cr, Mn, Fe, Co, Ni, Cu, Zn, Rh, Pd, Cd, Sn, Sb, etc. are contained in a total amount of not larger than 0.3% by weight in the sintered product.

The reason why the amount of such metals is limited as described above is because when the amount is larger than 0.3% by weight, the metal allergy tends to be induced. That is, the Danish Regulations specifying the amount of elution of metals that serve as a cause of allergy to be not larger than 0.5 $\mu$g/cm$^2$/week for preventing metal allergy, has been disclosed in the journal "Surface Technology, Vol. 45, No. 9, 1994, p. 910. When the content of metals that serve as a cause of allergy is not larger than 0.3% by weight, the silver-colored sintered product used as an ornamental article of the present invention reliably satisfies the above-mentioned standard. When the amount of the metals are larger than 0.3% by weight, however, the amount of elution of metals that serve as a cause of allergy may exceed 0.5 $\mu$g/cm$^2$/week. In such a case, metal allergy may develop depending upon the individual persons. According to the present invention, therefore, the content of the metals that could become a cause of allergy is limited to be not larger than 0.3% by weight. It is particularly desired that the amount of metals that serve as a cause of allergy is not larger than 0.1% by weight.

In order that the content of the metals that cause metal allergy is suppressed to be not larger than 0.3% by weight, it is recommended not to use the aforementioned metals in the method of producing the sintered product of the present invention but to use highly pure starting materials in which the above-mentioned metals are contained in small amounts.

According to the present invention, the silver-colored sintered product which is used as an ornamental article comprises at least titanium, carbon and boron as chief constituent elements, wherein titanium is contained in an amount of from 80 to 95% by weight, boron is contained in an amount of from 3 to 12% by weight and carbon is contained in an amount of from 2 to 8% by weight per the whole amount of titanium, carbon and boron, sintered product including chiefly a TiC phase and a TiB phase together but containing metals that are causes of allergy in amounts of not larger than 0.3% by weight per the whole amount. Moreover, the silver-colored sintered product contains at least titanium, carbon and boron as chief constituent elements and further contains at least one of V, Zr, Nb, Mo, Hf, Ta or W in an amount of from 0.5 to 15.0 parts by weight per 100 parts by weight of the three chief components comprising from 80 to 95% by weight of titanium, from 3 to 12% by weight of boron and from 2 to 8% by weight of carbon, the sintered product including a TiC phase and a TiB phase together but containing metals that are causes of allergy in amounts of not larger than 0.3% by weight per the whole amount.

In the foregoing were mentioned already the reasons of limiting the amounts of titanium, carbon and boron which are chief constituent elements within the above-mentioned ranges.

It is desired that at least one of V, Zr, Nb, Mo, Hf, Ta or W is contained in an amount of from 0.5 to 15 parts by weight relative to the chief components of titanium, carbon and boron because of the reasons described below. That is, with at least one of V, Zr, Nb, Mo, Hf, Ta or W being contained, it is allowed to further improve mechanical properties such as flexural strength, Vickers' hardness, fracture toughness, etc. Moreover, the amount is limited to be from 0.5 to 15.0 parts by weight. This is because, when the amount is smaller than 0.5 parts by weight, the mechanical properties are improved little. When the amount is larger than 15.0 parts by weight, on the other hand, the sinterability is deteriorated and the strength decreases, too. It is desired that at least one element selected from V, Zr, Nb, Mo, Hf, Ta and W is contained in an amount of from 2 to 12 parts by weight. Most of these elements solid-dissolve in the TiB or in the TiC phase to improve properties.

Most desirably, the composition contains titanium in an amount of from 85 to 90% by weight, boron in an amount of from 4 to 9% by weight and carbon in an amount of from 3 to 6% by weight, includes chiefly the TiC phase and the TiB phase, and further contains at least one element selected from V, Zr, Nb, Mo, Hf, Ta and W in an amount of from 2 to 12 parts by weight, but contains metals which are causes of allergy in amounts of not larger than 0.1% by weight in the whole amount.

The infered product includes chiefly the TiC phase and the TiB phase. The grain boundaries may include a metal titanium, V, Zr, Nb, Mo, Hf, Ta and W.

The silver-colored sintered product of the present invention is obtained by mixing, as starting powders, a titanium powder, a titanium carbide powder and a titanium boride powder, as well as elements such as V, Zr, Nb, Mo, Hf, Ta and W, or carbides or borides thereof, pulverizing these powders, adding a binder in a predetermined amount thereto, molding the mixture into an article or a desired shape under a predetermined pressure, removing the binder therefrom in a non-oxidizing atmosphere at a predetermined temperature, and firing the article at a predetermined temperature.

Desirably, the silver-colored sintered product according to the embodiment of the present invention is obtained by weighing a titanium carbide and a titanium boride having particle sizes of from 0.5 to 3.0 $\mu$m, a titanium powder having a particle size of from 5 to 250 $\mu$m, and, as desired, elements such as V, Zr, Nb, Mo, Hf, Ta and W or a carbide powder thereof or a boride powder thereof having particle sizes of from 1.0 to 10.0 $\mu$m, mixing and pulverizing them in an organic solvent such as acetone, adding an organic binder thereto, and molding the mixture into an article of a desired shape. From the molded article is then removed the binder in a non-oxidizing atmosphere at a predetermined temperature, and the article is fired in a vacuum heating furnace at a predetermined temperature.

Here, the boride of titanium may be either TiB$_2$ or TiB. When TiB$_2$ is used as the starting material, the TiB$_2$ and metal titanium react with each other at 1300 to 1600° C. to form TiB.

It is desired that TiB exists in the form of needle-like crystals in the sintered product but needs not necessarily exist in the form of needle-like crystals.

It is essential that the starting materials that are used contain metals that serve as a cause of allergy in amounts of not larger than 0.3% by weight in the whole starting materials.

The firing is carried out in an atmosphere of a degree of vacuum of from $10^{-1}$ to $10^{-5}$ Torr or in a variety of atmospheres under a reduced pressure or without applying pressure at a temperature of from 1300 to 1600° C. It is desired to further execute the hot isostaticpressure firing (HIP) in a non-oxidizing atmosphere under the pressure of 100 to 2000 atms at 1200 to 1400° C. The firing time is usually from 0.5 to 5 hours though it may vary depending upon the size of the sample. After the firing, the surface of the sintered product is polished like a mirror plane using a diamond paste or the like to obtain lustrous silver color.

According to the present invention, composition of the starting materials is so adjusted that the silver-colored sintered product contains titanium in an amount of from 80 to 95% by weight, boron in an amount of from 3 to 12% by weight and carbon in an amount of from 2 to 8% by weight per the whole amount, so as to include the TiC phase and the TiB phase.

In the silver-colored sintered product of the present invention, characteristics are not affected by the inclusion of small amounts of impurities, other compounds or metals provided the above-mentioned composition ranges of the present invention are satisfied.

In the silver-colored sintered product of the present invention, the TiC phase in the sintered product contributes to imparting silver color, and the TiB phase contributes to improving mechanical properties such as flexural strength, Vickers' hardness, fracture toughness, etc. According to the present invention, the sintered product is constituted chiefly by the TiC phase and the TiB phase and, hence, exhibits lustrous silver color, excellent flexural strength, Vickers' hardness and fracture toughness, and is further sintered at a temperature of as low as from 1300 to 1600° C.

Moreover, V, Zr, Nb, Mo, Hf, Ta and W that are contained contributes to further improving mechanical properties such as flexural strength, hardness and fracture toughness.

In the silver-colored sintered product for use as an ornamental article, furthermore, the metals that could cause allergy are contained in amounts of not larger than 0.3% by weight, making it possible to reliably prevent the occurrence of allergy. Such a silver-colored sintered product can be used as ornamental articles such as timepiece casings, timepiece bands, necklaces, bracelets, etc., as well as for pairs of scissors, blades, fishing gears and as any other tools and machine parts.

EXAMPLES

Example 1

A TiC powder and a $TiB_2$ powder having an average particle diameter of 1.1 $\mu$m, a Ti powder having a particle diameter of 40 $\mu$m, at least one of V, Cr, Zr, Nb, Mo, Hf, Ta or W, or a carbide powder thereof or a boride powder thereof having an average particle diameter 2.0 $\mu$m were weighed and mixed as starting powders in such amounts that the atomic ratios of the metals in the finally sintered products were as shown in Table 1, pulverized in an organic solvent such as acetone for about 68 hours, followed by the addition of paraffin in an amount of 6% by weight. The mixture was then molded into an article of a desired shape under a pressure of 2.0 tons/cm$^2$. From the molded article was removed the binder in a non-oxidizing atmosphere at a temperature of 400° C. The article was then fired in a vacuum heating furnace having a vacuum degree of $10^{-3}$ Torr at a temperature of 1450° C. for one hour and was then subjected to the hot isostatic pressure firing in an argon atmosphere at a temperature of 1300° C. for one hour.

The thus obtained finally sintered products were identified for its crystal phase by the X-ray diffraction measurement. It was confirmed that the articles of the present invention all contained chiefly the TiC phase and the TiB phase. The sintered products were analyzed by the Inductively Coupled Plasma Emission Spectrophotometry (ICP) to find atomic ratios of the metals.

The metal phase containing Ti as a chief component was analyzed using a Electron Probe X-ray Microanalyzer (EPMA) and the presence of metals M and N was confirmed.

The sintered products were flatly polished to examine deflection strength and were further polished like a mirror plane, Vickers' hardness (Hv), fracture toughness and corrosion resistance, and the color of the sintered product was confirmed by eyes. The deflection strength was measured in compliance with the three-point-bending testing method under JIS R1601 and the Vickers' hardness was measured in compliance with the testing method under JIS Z2244. The fracture toughness was found according to the IF method. The corrosion resistance was tested by using, as a corroding solution, an artificial sweat (pH 4.7) in compliance with the standard of ISO (International Standardization Organization), immersing the lower half of the mirror plane-polished sample in the artificial sweat maintained at 37° C.±2° C. for 24 hours, and the states of the lower half and upper half of the mirror plane-polished sample after immersed were observed and compared. The polished surface that was not corroded was regarded to be good and the polished surface that was corroded a little was regarded to be not good. It was confirmed by eyes that the samples all exhibited lustrous silver color. The results were as shown in Table 1.

TABLE 1

| Sample No. | Ti boride Ti carbide compo. | Amount (wt. %) | a | b | c | x | y | z | Flexural strength (MPa) | Hardness Hv (GPa) | Toughness MPam½ | Corrosion resistance |
|---|---|---|---|---|---|---|---|---|---|---|---|---|
| 1-*1 | $(Ti_{0.75} Mo_{0.25})B$ $TiC_{0.8}$ | 60 | 0.75 | 0.25 | 1.00 | 1.0 | 0 | 0.8 | 600 | 10.4 | 4.1 | unfair |
| 1-2 | $(Ti_{0.80} Mo_{0.20})B$ $TiC_{0.8}$ | 70 | 0.80 | 0.20 | 1.00 | 1.0 | 0 | 0.8 | 800 | 11.0 | 6.5 | good |
| 1-3 | $(Ti_{0.90} Mo_{0.10})B$ $TiC_{0.8}$ | 80 | 0.90 | 0.10 | 1.00 | 1.0 | 0 | 0.8 | 1000 | 10.6 | 8.5 | good |

TABLE 1-continued

| Sample No. | Ti boride Ti carbide compo. | Amount (wt. %) | a | b | c | x | y | z | Flexural strength (MPa) | Hardness Hv (GPa) | Toughness MPam½ | Corrosion resistance |
|---|---|---|---|---|---|---|---|---|---|---|---|---|
| 1-4 | $(Ti_{0.95} Mo_{0.05})B$ $TiC_{0.8}$ | 95 | 0.95 | 0.05 | 1.00 | 1.0 | 0 | 0.8 | 1000 | 12.8 | 9.0 | good |
| 1-5 | $TiB_{0.98}$ $TiC_{0.8}$ | 100 | 1.00 | 0 | 0.98 | 1.0 | 0 | 0.8 | 900 | 13.8 | 8.0 | good |
| 1-6 | $(Ti_{0.85} Mo_{0.10} W_{0.05})B$ $TiC_{0.8}$ | 70 | 0.85 | 0.15 | 1.00 | 1.0 | 0 | 0.8 | 1000 | 13.0 | 12.0 | good |
| 1-*7 | $(Ti_{0.75} Mo_{0.25})B$ $(Ti_{0.80} Zr_{0.20})C_{0.8}$ | 60 | 0.75 | 0.25 | 1.00 | 0.80 | 0.20 | 0.9 | 650 | 9.8 | 4.6 | good |
| 1-8 | $(Ti_{0.85} W_{0.15})B$ $(Ti_{0.90} Zr_{0.10})C_{0.8}$ | 70 | 0.85 | 0.15 | 1.00 | 0.90 | 0.10 | 0.8 | 850 | 9.0 | 9.6 | good |
| 1-9 | $(Ti_{0.85} Cr_{0.15})B$ $(Ti_{0.90} Zr_{0.10})C_{0.8}$ | 70 | 0.85 | 0.15 | 1.00 | 0.90 | 0.10 | 0.8 | 800 | 14.5 | 7.8 | good |
| 1-10 | $(Ti_{0.90} Mo_{0.10})B$ $(Ti_{0.95} V_{0.05})C_{0.8}$ | 85 | 0.90 | 0.10 | 1.00 | 0.95 | 0.05 | 0.8 | 840 | 11.5 | 9.2 | good |
| 1-*11 | $(Ti_{0.90} Mo_{0.10})B_{0.75}$ $(Ti_{0.80} V_{0.20})C_{0.8}$ | 70 | 0.90 | 0.10 | 0.75 | 0.80 | 0.20 | 0.9 | 600 | 9.0 | 5.2 | good |
| 1-12 | $(Ti_{0.85} Hf_{0.15})B_{0.80}$ $TiC_{0.70}$ | 80 | 0.85 | 0.15 | 0.80 | 1.00 | 0 | 0.70 | 850 | 11.2 | 7.2 | good |
| 1-13 | $(Ti_{0.90} Nb_{0.10})B_{0.90}$ $(Ti_{0.95} Zr_{0.05})C_{0.8}$ | 90 | 0.90 | 0.10 | 0.90 | 0.95 | 0.05 | 0.90 | 900 | 12.0 | 6.8 | good |
| 1-*14 | $(Ti_{0.85} Mo_{0.15})B$ $(Ti_{0.75} Zr_{0.25})C_{0.85}$ | 65 | 0.85 | 0.15 | 1.00 | 0.75 | 0.25 | 0.85 | 650 | 10.1 | 5.4 | unfair |
| 1-15 | $(Ti_{0.90} Cr_{0.10})B_{0.95}$ $(Ti_{0.90} V_{0.10})C$ | 75 | 0.90 | 0.10 | 0.95 | 0.90 | 0.10 | 1.00 | 900 | 11.0 | 8.3 | good |
| 1-16 | $(Ti_{0.90} W_{0.10})B_{0.95}$ $(Ti_{0.80} Zr_{0.20})C_{0.80}$ | 70 | 0.90 | 0.10 | 0.95 | 0.80 | 0.20 | 0.80 | 820 | 9.6 | 7.0 | good |
| 1-17 | $(Ti_{0.90} Mo_{0.10})B$ $(Ti_{0.90} Zr_{0.10})C_{0.8}$ | 80 | 0.90 | 0.10 | 1.00 | 0.90 | 0.10 | 0.60 | 850 | 10.0 | 7.0 | good |

Samples marked with * lie outside the scope of the invention

It will be learned from Table 1 above that the samples of the present invention have flexural strength of not smaller than 800 MPa, Vickers' hardness of not smaller than 9.0 GPa, fracture toughness of not smaller than 6.5 MPa·m$^{1/2}$ and exhibit good corrosion resistance.

Example 2

A TiC powder and a TiB$_2$ powder having an average particle diameter of 1.1 μm, and a Ti powder having a particle diameter of 40 μm were weighed and mixed as starting powders in such amounts as shown in Table 1, pulverized in an organic solvent such as acetone for about 68 hours, followed by the addition of paraffin in an amount of 6% by weight. The mixture was then molded into an article of a desired shape under a pressure of 2.0 tons/cm$^2$. From the molded article was removed the binder in a non-oxidizing atmosphere at a temperature of 400° C. The article was then fired in a vacuum heating furnace having a vacuum degree of 10$^{-3}$ Torr at temperatures shown in Table 2 for one hour. The firing was carried out while adjusting the atmosphere so that the compositions were not changed.

The thus obtained finally sintered products were identified for its crystal phase by the X-ray diffraction measurement. It was confirmed that the articles of the present invention all contained chiefly the TiC phase and the TiB phase. The sintered products were analyzed by the ICP. The results were as shown in Table 2.

TABLE 2

| Sample No. | Starting material composition (wt. %) | | | Firing temp. (° C.) | Ratio of components of sintered products (wt. %) | | | Ti is contained | Aspect ratio of TiB particles |
|---|---|---|---|---|---|---|---|---|---|
| | TiC | TiB$_2$ | Ti | | Ti | C | B | | |
| 2-1 | 12.0 | 9.6 | 78.4 | 1300 | 95.0 | 2.0 | 3.0 | ○ | 5.0 |
| 2-2 | 15.6 | 12.9 | 71.5 | 1400 | 93.4 | 2.6 | 4.0 | ○ | 5.0 |
| 2-3 | 18.0 | 17.4 | 64.6 | 1450 | 91.6 | 3.0 | 5.4 | ○ | 4.0 |
| 2-4 | 20.3 | 18.3 | 61.4 | 1450 | 90.9 | 3.4 | 5.7 | ○ | 1.7 |
| 2-5 | 21.5 | 20.6 | 57.9 | 1450 | 90.0 | 3.6 | 6.4 | ○ | 3.3 |
| 2-6 | 26.3 | 24.1 | 49.6 | 1450 | 88.1 | 4.4 | 7.5 | ○ | 5.6 |
| 2-7 | 30.0 | 28.9 | 41.1 | 1450 | 86.0 | 5.2 | 8.8 | ○ | 3.3 |
| 2-8 | 31.1 | 31.5 | 37.4 | 1500 | 85.0 | 5.2 | 9.8 | Δ | 6.3 |
| 2-9 | 35.3 | 32.1 | 32.6 | 1500 | 84.1 | 5.9 | 10.0 | Δ | 4.3 |
| 2-10 | 35.9 | 34.7 | 29.4 | 1550 | 83.2 | 6.0 | 10.8 | Δ | 2.9 |
| 2-11 | 42.5 | 36.3 | 21.2 | 1550 | 81.6 | 7.1 | 11.3 | Δ | 3.3 |
| 2-12 | 42.8 | 38.6 | 18.6 | 1600 | 80.2 | 7.8 | 12.0 | X | 2.9 |

TABLE 2-continued

| Sample No. | Starting material composition (wt. %) | | | Firing temp. (° C.) | Ratio of components of sintered products (wt. %) | | | Ti is contained | Aspect ratio of TiB particles |
|---|---|---|---|---|---|---|---|---|---|
| | TiC | TiB$_2$ | Ti | | Ti | C | B | | |
| 2-13 | 43.9 | 38.6 | 17.5 | 1600 | 80.0 | 8.0 | 12.0 | X | 2.2 |
| 2-*14 | 43.0 | 41.1 | 15.9 | 1700 | 79.7 | 7.5 | 12.8 | X | 1.7 |
| 2-*15 | 52.6 | 44.4 | 3.0 | 1700 | 76.6 | 9.6 | 13.8 | X | 1.4 |

Samples marked with * lie outside the scope of the invention.

In Table 2, ○ represents a case where the presence of metal titanium was confirmed by both the X-ray diffraction measurement and by the observation of composition by SEM, Δ represents a case where it was confirmed by the X-ray diffraction measurement but was not confirmed by the observation of composition by SEM, and X represents a case where it was confirmed by neither the X-ray diffraction measurement nor by the observation of composition by SEM. FIG. 1 is a diagram of composition as observed by using SEM, wherein reference numeral 1 denotes the TiC phase and 2 denotes the TiB phase. An average aspect ratio of TiB particles was also found from the observation of composition by SEM.

The sintered products were flatly polished tested for their deflection strength and mirror plane-polished, Vickers' hardness (Hv), fracture toughness and corrosion resistance, and were further confirmed for their colors by eyes. The flexural strength was measured according to the three-point-bending test stipulated under JIS R1601, the Vickers' hardness was measured in compliance with the testing method of JIS Z2244, and the fracture toughness was found by the IF method.

The corrosion resistance was tested by using, as a corroding solution, an artificial sweat (pH 4.7) in compliance with the standard of ISO (International Standardization Organization), immersing the lower half of the mirror plane-polished sample in the artificial sweat maintained at 37° C.±2° C. for 24 hours, and the states of the mirror plane-polished sample after immersed were observed. The polished surface that was not corroded was regarded to be good and the polished surface that was corroded a little was regarded to be not good. It was confirmed by eyes that the samples all exhibited lustrous silver color. The results were as shown in Table 3.

TABLE 3

| Sample No. | Flexural strength (MPa) | Vickers' hardness (GPa) | Fracture toughness (MPa · m$^{1/2}$) | Corrosion resistance |
|---|---|---|---|---|
| 2-1 | 1000 | 10.0 | 6.1 | good |
| 2-2 | 900 | 10.3 | 6.3 | good |
| 2-3 | 820 | 11.0 | 6.3 | good |
| 2-4 | 800 | 11.7 | 6.8 | good |
| 2-5 | 820 | 11.5 | 6.6 | good |
| 2-6 | 810 | 11.7 | 6.4 | good |
| 2-7 | 750 | 12.8 | 6.3 | good |
| 2-8 | 750 | 12.8 | 6.3 | good |
| 2-9 | 700 | 13.0 | 5.9 | good |
| 2-10 | 700 | 13.4 | 5.4 | good |
| 2-11 | 700 | 13.3 | 5.3 | good |
| 2-12 | 700 | 13.5 | 5.1 | good |
| 2-13 | 700 | 13.4 | 5.0 | good |
| 2-*14 | 660 | 14.2 | 4.0 | unfair |
| 2-*15 | 520 | 14.8 | 3.4 | unfair |

Samples marked with * lie outside the scope of the invention.

It will be learned from Tables 2 and 3 above that the samples of the present invention have flexural strength of from 700 to 1000 MPa, Vickers' hardness of from 10.0 to 13.5 GPa, fracture toughness of from 5.0 to 6.8 MPa·m$^{1/2}$ and exhibit good corrosion resistance.

Example 3

A TiC powder and a TiB$_2$ powder having an average particle diameter of 1.1 μm, a Ti powder having a particle diameter of 40 μm and elements of the Groups 4a, 5a and 6a of periodic table or carbides thereof or borides thereof having an average particle diameter of 1.0 μm were weighed and mixed as starting powders in such amounts that the amounts of metals in the finally sintered products were at ratios as shown in Table 3, pulverized in an organic solvent such as acetone for about 68 hours, followed by the addition of paraffin in an amount of 6% by weight. The mixture was then molded into an article of a desired shape under a pressure of 2.0 tons/cm². From the molded article was removed the binder in a non-oxidizing atmosphere at a temperature of 400° C. The article was then fired in a vacuum heating furnace having a vacuum degree of 10$^{-3}$ Torr at a temperature of 1450° C. for one hour and was then subjected to the hot isostatic pressure firing (HIP) in an argon atmosphere at a temperature of 1300° C. for one hour.

The thus obtained finally sintered product was measured for its crystal phase, analyzed for its metal elements and measured for its aspect ratio in the same manner as in Example 2. The results were as shown in Table 4.

TABLE 4

| Sample No. | Ratio of components of sintered products (wt. %) | | | | Ti is contained | Aspect ratio of TiB particles |
|---|---|---|---|---|---|---|
| | Ti | C | B | Element of Groups 4a, 5a, 6a parts by wt | | |
| 3-1 | 88.1 | 4.4 | 7.5 | V 1.8 | ○ | 3.5 |
| 3-2 | 88.1 | 4.4 | 7.5 | Cr 1.9 | ○ | 2.3 |
| 3-3 | 88.1 | 4.4 | 7.5 | Zr 3.4 | ○ | 3.1 |
| 3-4 | 88.1 | 4.4 | 7.5 | Nb 3.4 | ○ | 4.0 |

TABLE 4-continued

| Sample No. | Ratio of components of sintered products (wt. %) | | | | Ti is contained | Aspect ratio of TiB particles |
|---|---|---|---|---|---|---|
| | Ti | C | B | Element of Groups 4a, 5a, 6a parts by wt | | |
| 3-5 | 88.1 | 4.4 | 7.5 | No 7.5 | ○ | 3.7 |
| 3-6 | 88.1 | 4.4 | 7.5 | Ta 6.7 | ○ | 3.3 |
| 3-7 | 88.1 | 4.4 | 7.5 | W 6.8 | ○ | 4.0 |
| 3-8 | 86.0 | 5.2 | 8.8 | V 1.8 | ○ | 3.3 |
| 3-9 | 86.0 | 5.2 | 8.8 | Cr 1.9 | ○ | 2.4 |
| 3-10 | 86.0 | 5.2 | 8.8 | Zr 3.4 | ○ | 4.0 |
| 3-11 | 86.0 | 5.2 | 8.8 | Hf 3.4 | ○ | 3.7 |
| 3-12 | 86.0 | 5.2 | 8.8 | Mo 7.5 | ○ | 3.3 |
| 3-13 | 86.0 | 5.2 | 8.8 | W 6.8 | ○ | 3.3 |
| 3-14 | 88.1 | 4.4 | 7.5 | V 0.2 Mo 0.3 Tot. 0.5 | ○ | 3.6 |
| 3-15 | 88.1 | 4.4 | 7.5 | Zr 3.5 Nb 3.5 Tot. 7.0 | ○ | 2.5 |
| 3-16 | 88.1 | 4.4 | 7.5 | V 2.0 Mo 6.0 Tot. 8.0 | ○ | 2.6 |
| 3-17 | 88.1 | 4.4 | 7.5 | Zr 4.0 W 6.4 Tot. 10.4 | ○ | 2.2 |
| 3-18 | 86.0 | 5.2 | 8.8 | Zr 4.0 Mo 7.3 Tot. 11.3 | ○ | 2.2 |
| 3-19 | 86.0 | 5.2 | 8.8 | Nb 4.8 Mo 8.0 Tot. 12.8 | ○ | 2.0 |
| 3-20 | 86.0 | 5.2 | 8.8 | W 7.5 Mo 7.5 Tot. 15.0 | ○ | 5.0 |
| 3-21 | 86.0 | 5.2 | 8.8 | Ta 7.0 Mo 13.0 Tot. 20.0 | ○ | 2.9 |

(Tot.: Total)

The sintered products were flatly polished and were further polished like a mirror plane to examine aspect ratio, deflection strength, Vickers' hardness (Hv), fracture toughness and corrosion resistance in the same manner as in Example 2. The color of the sintered products was confirmed by eyes. As a result of observation by eyes, it was confirmed that the samples all exhibited lustrous silver color.

The results were as shown in Table 5.

TABLE 5

| Sample No. | Flexural strength (MPa) | Vickers' hardness (GPa) | Fracture toughness (MPa · m½) | Corrosion resistance |
|---|---|---|---|---|
| 3-1 | 800 | 12.3 | 6.7 | good |
| 3-2 | 850 | 11.9 | 6.8 | good |
| 3-3 | 800 | 10.3 | 8.9 | good |
| 3-4 | 800 | 10.9 | 6.8 | good |
| 3-5 | 1000 | 11.1 | 8.8 | good |
| 3-6 | 1000 | 13.0 | 6.0 | gocd |
| 3-7 | 900 | 12.7 | 6.3 | good |
| 3-8 | 1000 | 13.0 | 6.8 | good |
| 3-9 | 700 | 14.7 | 5.0 | good |
| 3-10 | 950 | 14.1 | 5.2 | good |
| 3-11 | 800 | 13.2 | 6.0 | good |
| 3-12 | 1000 | 13.3 | 6.5 | good |
| 3-13 | 1000 | 13.8 | 6.6 | good |
| 3-14 | 800 | 11.0 | 9.8 | qood |
| 3-15 | 860 | 12.1 | 8.0 | good |
| 3-16 | 940 | 10.3 | 9.9 | good |
| 3-17 | 1100 | 11.0 | 8.7 | good |
| 3-18 | 960 | 10.9 | 8.6 | good |
| 3-19 | 1020 | 10.1 | 10.0 | good |
| 3-20 | 1100 | 11.8 | 8.7 | good |
| 3-21 | 880 | 10.2 | 8.2 | good |

It will be understood from these Tables 4 and 5 that the sintered products to which are added elements of the Groups 4a, 5a and 6a of periodic table exhibit particularly improved flexural strength and fracture toughness.

Example 4

A TiC powder and a TiB$_2$ powder having an average particle diameter of 1.1 μm, and a Ti powder having a particle diameter of 40 μm were weighed and mixed as starting powders in such amounts as shown in Table 1, pulverized in an organic solvent such as acetone for about 68 hours, followed by the addition of paraffin in an amount of 6% by weight. The mixture was then molded into an article of a desired shape under a pressure of 2.0 tons/cm$^2$. From the molded article was removed the binder in a non-oxidizing atmosphere at a temperature of 400° C. The article was then fired in a vacuum heating furnace having a vacuum degree of 10$^{-3}$ Torr at temperatures shown in Table 6 for one hour. The firing was carried out while adjusting the atmosphere so that the compositions were not changed.

TABLE 6

| Sample No. | Starting material composition (wt. %) | | | Firing temp. (° C.) | Ratio of components of sintered products (wt. %) | | | Ti is contained | Amount of allergy-causing metals (wt %) |
|---|---|---|---|---|---|---|---|---|---|
| | TiC | TiB$_2$ | Ti | | Ti | C | B | | |
| 4-1 | 12.0 | 9.6 | 78.4 | 1300 | 95.0 | 2.0 | 3.0 | ○ | 0.16 |
| 4-2 | 15.6 | 12.9 | 71.5 | 1400 | 93.4 | 2.6 | 4.0 | ○ | 0.15 |
| 4-3 | 18.0 | 17.4 | 64.6 | 1450 | 91.6 | 3.0 | 5.4 | ○ | 0.18 |
| 4-4 | 20.3 | 18.3 | 61.4 | 1450 | 90.9 | 3.4 | 5.7 | ○ | 0.14 |
| 4-5 | 21.5 | 20.6 | 57.9 | 1450 | 90.0 | 3.6 | 6.4 | ○ | 0.20 |
| 4-6 | 26.3 | 24.1 | 49.6 | 1450 | 88.1 | 4.4 | 7.5 | ○ | 0.22 |
| 4-7 | 30.0 | 28.9 | 41.1 | 1450 | 86.0 | 5.2 | 8.8 | ○ | 0.26 |
| 4-8 | 31.1 | 31.5 | 37.4 | 1500 | 85.0 | 5.2 | 9.8 | Δ | 0.20 |
| 4-9 | 35.3 | 32.1 | 32.6 | 1500 | 84.1 | 5.9 | 10.0 | Δ | 0.24 |
| 4-10 | 35.9 | 34.7 | 29.4 | 1550 | 83.2 | 6.0 | 10.8 | Δ | 0.30 |
| 4-11 | 42.5 | 36.3 | 21.2 | 1550 | 81.6 | 7.1 | 11.3 | Δ | 0.25 |
| 4-12 | 42.8 | 38.6 | 18.6 | 1600 | 80.2 | 7.8 | 12.0 | X | 0.20 |
| 4-13 | 43.9 | 38.6 | 17.5 | 1600 | 80.0 | 8.0 | 12.0 | X | 0.26 |
| 4-*14 | 43.0 | 41.1 | 15.9 | 1700 | 79.7 | 7.5 | 12.8 | X | 0.24 |
| 4-*15 | 52.6 | 44.4 | 3.0 | 1700 | 76.6 | 9.6 | 13.8 | X | 0.28 |

Samples marked with * lie outside the scope of the invention.

The thus obtained finally sintered products were identified for its crystal phase by the X-ray diffraction measurement.

It was confirmed that the articles of the present invention all contained chiefly the TiC phase and the TiB phase. The sintered products were analyzed by the ICP. The results were as shown in Table 6. Presence of Ni and Fe only were confirmed in the sintered product as metals causing allergy. Therefore, Table 6 shows the amounts of Ni and Fe.

In Table 6, ○ represents a case where the presence of metal titanium was confirmed by both the X-ray diffraction measurement and by the observation of composition by SEM, Δ represents a case where it was confirmed by the X-ray diffraction measurement but was not confirmed by the observation of composition by SEM, and X represents a case where it was confirmed by neither the X-ray diffraction measurement nor by the observation of composition by SEM.

The sintered products were flatly polished and mirror plane-polished, tested for their deflection strength, Vickers' hardness (Hv), fracture toughness, corrosion resistance and elution of metals, and were further confirmed for their colors by eyes.

The flexural strength was measured according to the three-point-bending test stipulated under JIS R1601, the Vickers' hardness was measured in compliance with the testing method of JIS Z2244, and the fracture toughness was found by the IF method. The corrosion resistance was tested by using, as a corroding solution, an artificial sweat (pH 4.7) in compliance with the standard of ISO (International Standardization Organization), immersing the mirror plane-polished sample in the artificial sweat maintained at 37° C.±2° C. for a week, and the state of the polished surface was observed to examine the degree of corrosion. The polished surface that was not corroded was regarded to be good and the polished surface that was corroded a little was regarded to be not good. It was confirmed by eyes that the samples all exhibited lustrous silver color. The results were as shown in Table 7.

TABLE 7

| Sample No. | Flexural strength (MPa) | Vickers' hardness (GPa) | Fracture toughness (MPa · m½) | Corrosion resistance |
|---|---|---|---|---|
| 4-1 | 1000 | 10.0 | 6.1 | good |
| 4-2 | 900 | 10.3 | 6.3 | good |
| 4-3 | 820 | 11.0 | 6.3 | good |
| 4-4 | 800 | 11.7 | 6.8 | good |
| 4-5 | 820 | 11.5 | 6.6 | good |
| 4-6 | 810 | 11.7 | 6.4 | good |
| 4-7 | 750 | 12.8 | 6.3 | good |
| 4-8 | 750 | 12.8 | 6.3 | good |
| 4-9 | 700 | 13.0 | 5.9 | good |
| 4-10 | 700 | 13.4 | 5.4 | good |
| 4-11 | 700 | 13.3 | 5.3 | good |
| 4-12 | 700 | 13.5 | 5.1 | good |
| 4-13 | 700 | 13.4 | 5.0 | good |
| 4-*14 | 660 | 14.2 | 4.0 | unfair |
| 4-*15 | 520 | 14.8 | 3.4 | unfair |

Samples marked with * lie outside the scope of the invention.

It will be learned from Tables 6 and 7 above that the samples of the present invention have flexural strengths of from 700 to 1000 MPa, Vickers' hardness of from 10.0 to 13.5 GPa, fracture toughness of from 5.0 to 6.8 MPa·m$^{1/2}$ and exhibit good corrosion resistance.

In the samples of the present invention, furthermore, the contents of metals causing allergy are not larger than 0.3% by weight making it possible to reliably prevent the occurrence of metal allergy.

Example 5

A TiC powder and a TiB$_2$ powder having an average particle diameter of 1.1 μm, a Ti powder having a particle diameter of 40 μm and elements of V, Zr, Nb, Mo, Hf, Ta and W or carbides thereof or borides thereof having an average particle diameter of 1.0 μm were weighed and mixed as starting powders in such amounts that the amounts of metals in the finally sintered products were at ratios as shown in Table 3, pulverized in an organic solvent such as acetone for about 68 hours, followed by the addition of paraffin in an amount of 6% by weight. The mixture was then molded into an article of a desired shape under a pressure of 2.0 tons/cm$^2$. From the molded article was removed the binder in a non-oxidizing atmosphere at a temperature of 400° C. The article was then fired in a vacuum heating furnace having a vacuum degree of 10$^{-3}$ Torr at a temperature of 1450° C. for one hour and was then subjected to the hot isostatic pressure firing (HIP) in an argon atmosphere at a temperature of 1300° C. for one hour. The thus obtained finally sintered product was measured for its crystal phase, analyzed for its metal elements and measured for the contents of metals causing allergy in the same manner as in Example 1. The results were as shown in Table 8.

TABLE 8

| Sample No. | Ratio of components of sintered products (wt. %) | | | | Ti is contained | Amount of allergy causing metals |
|---|---|---|---|---|---|---|
| | Ti | C | B | Element of Groups 4a, 5a, 6a parts by wt | | |
| 5-1 | 88.1 | 4.4 | 7.5 | V 1.8 | ○ | 0.13 |
| 5-2 | 88.1 | 4.4 | 7.5 | Zr 3.4 | ○ | 0.15 |
| 5-3 | 88.1 | 4.4 | 7.5 | Nb 3.4 | ○ | 0.15 |
| 5-4 | 88.1 | 4.4 | 7.5 | Mo 7.5 | ○ | 0.13 |
| 5-5 | 88.1 | 4.4 | 7.5 | Ta 6.7 | ○ | 0.12 |
| 5-6 | 88.1 | 4.4 | 7.5 | W 6.8 | ○ | 0.13 |
| 5-7 | 86.0 | 5.2 | 8.8 | V 1.8 | ○ | 0.11 |
| 5-8 | 86.0 | 5.2 | 8.8 | Zr 3.4 | ○ | 0.11 |
| 5-9 | 86.0 | 5.2 | 8.8 | Hf 3.4 | ○ | 0.11 |
| 5-10 | 86.0 | 5.2 | 8.8 | Mo 7.5 | ○ | 0.11 |
| 5-11 | 86.0 | 5.2 | 8.8 | W 6.8 | ○ | 0.12 |
| 5-12 | 88.1 | 4.4 | 7.5 | V 0.2 Mo 0.3 Tot. 0.5 | ○ | 0.13 |
| 5-13 | 88.1 | 4.4 | 7.5 | Zr 3.5 Nb 3.5 Tot. 7.0 | ○ | 0.16 |
| 5-14 | 88.1 | 4.4 | 7.5 | V 2.0 Mo 6.0 Tot. 8.0 | ○ | 0.15 |
| 5-15 | 88.1 | 4.4 | 7.5 | Zr 4.0 W 6.4 Tot. 10.4 | ○ | 0.14 |
| 5-16 | 86.0 | 5.2 | 8.8 | Zr 4.0 Mo 7.3 Tot. 11.3 | ○ | 0.14 |
| 5-17 | 86.0 | 5.2 | 8.8 | Nb 4.8 Mo 8.0 Tot. 12.8 | ○ | 0.14 |
| 5-18 | 86.0 | 5.2 | 8.8 | W 7.5 Mo 7.5 Tot. 15.0 | ○ | 0.16 |

The sintered product was flatly polished and was further polished like a mirror plane to examine deflection strength, Vickers' hardness (Hv), fracture toughness, corrosion resistance and elution of metals in the same manner as in Example 4. The color of the sintered product was confirmed by eyes. As a result of observation by eyes, it was confirmed that the samples all exhibited lustrous silver color.

The results were as shown in Table 9.

TABLE 9

| Sample No. | Flexural strength (MPa) | Vickers' hardness (GPa) | Fracture toughness (MPa · m½) | Corrosion resistance |
|---|---|---|---|---|
| 5-1 | 800 | 12.3 | 6.7 | good |
| 5-2 | 800 | 10.3 | 8.9 | good |
| 5-3 | 800 | 10.9 | 6.8 | good |
| 5-4 | 1000 | 11.1 | 8.8 | good |
| 5-5 | 1000 | 13.0 | 6.0 | good |
| 5-6 | 900 | 12.7 | 6.3 | good |
| 5-7 | 1000 | 13.0 | 6.8 | good |
| 5-8 | 950 | 14.1 | 5.2 | good |
| 5-9 | 800 | 13.2 | 6.0 | good |

TABLE 9-continued

| Sample No. | Flexural strength (MPa) | Vickers' hardness (GPa) | Fracture toughness (MPa · m½) | Corrosion resistance |
|---|---|---|---|---|
| 5-10 | 1000 | 13.3 | 6.5 | good |
| 5-11 | 1000 | 13.8 | 6.6 | good |
| 5-12 | 800 | 11.0 | 9.8 | good |
| 5-13 | 860 | 12.1 | 8.0 | good |
| 5-14 | 940 | 10.3 | 9.9 | good |
| 5-15 | 1100 | 11.0 | 8.7 | good |
| 5-16 | 960 | 10.9 | 8.6 | good |
| 5-17 | 1020 | 10.1 | 10.0 | good |
| 5-18 | 1100 | 11.8 | 8.7 | good |

It will be understood from these Tables 8 and 9 that the sintered product containing at least one of V, Zr, Nb, Mo, Hf, Ta or W helps particularly improve the flexural strength and fracture toughness. It will be further understood that the contents of metals causing allergy are not larger than 0.3% by weight.

What is claimed is:

1. A silver-colored sintered product containing at least titanium, carbon and boron as constituent elements and having a flexural strength of not smaller than 700 MPa, a Vickers' hardness of not smaller than 9.0 GPa and a fracture toughness of not smaller than 5.0 MPa·m$^{1/2}$, wherein the sintered product comprises a metal boride phase represented by the following composition formula (I) and a metal carbide phase represented by the following composition formula (II), $(Ti_aM_b)B_c$, (I)

$(Ti_xN_y)C_z$, (II)

wherein M and N denote, respectively, at least one of the elements selected from the elements of the Groups 4a, 5a and 6a of periodic table but excluding Ti, and a, b, c, x, y and z satisfy the following relations:
0.8≦a≦1.0
0≦b≦0.2
0.8≦c≦1.0
a+b=1
0.8≦x≦1.0
0≦y≦0.2
0.6≦z≦1.0
x+y=1, and wherein the total amount of the metal boride phase and the metal carbide phase is at least 75% by weight of the sintered product.

2. The silver-colored sintered product according to claim 1, wherein the sintered product comprises a metal boride phase represented by the formula (I), a metal carbide phase represented by the formula (II), and a remainder of a metal phase consisting chiefly of titanium and unavoidable impurities.

3. The sintered product according to claim 2, wherein M and N in the formulas (I) and (II) are, respectively, at least one of the metals selected from Mo, Ta and W, and a, b, c, x, y and z in the formulas (I) and (II) satisfy the following relations:
0.85≦a≦0.95
0.05≦b≦0.15
0.9≦c≦1.0
a+b=1
0.9≦x≦0.95
0.05≦y≦0.10
0.7≦z≦0.9
x+y=1.

4. The silver-colored sintered product according to claim 1, containing titanium in an amount of from 80 to 95% by weight, boron in an amount of from 3 to 12% by weight and carbon in an amount of from 2 to 8% by weight per the whole amount of titanium, carbon and boron which are the constituent elements, the sintered product including a TiC phase and a TiB phase together.

5. The silver-colored sintered product according to claim 4, wherein at least part of the TiB phase is in a needle crystalline form.

6. The silver-colored sintered product according to claim 4, wherein the sintered product contains at least one metal impurity from the group comprising Al, Cr, Mn, Fe, Co, Ni, Cu, Zn, Rh, Pd, Cd, Sn, and Sb, the total amount of the metal impurities being not larger than 0.3% by weight of the sintered product.

7. The silver-colored sintered product according to claim 1, containing at least one of the elements of the Groups 4a, 5a and 6a of periodic table but excluding Ti in amounts of from 0.5 to 20.0 parts by weight per 100 parts by weight of the three chief components of from 80 to 95% by weight of titanium, from 3 to 12% by weight of boron and from 2 to 8% by weight of carbon, the sintered product including a TiC phase and a TiB phase together.

8. The silver-colored sintered product according to claim 7, wherein at least part of the TiB phase is in a needle crystalline form.

9. The silver-colored sintered product according to claim 7, wherein at least one of the elements selected from V, Zr, Nb, Mo, Hf, Ta and W is contained in an amount of from 0.5 to 15.0 parts by weight per 100 parts by weight of the chief components, and the contents of metals that may serve as a cause of allergy are suppressed to be not larger than 0.3% by weight per the whole amount of the sintered product.

10. The silver-colored sintered product of claim 1, wherein the sintered product is obtained by molding a mixture comprising a powder of titanium, a powder of a carbide of titanium and a powder of a boride of titanium, into an article of a predetermined shape, and firing the molded article in a non-oxidizing atmosphere at a temperature of from 1300 to 1600° C.

11. The silver-colored sintered product of claim 1, wherein the powder of a boride of titanium is a powder of titanium diboride (TiB$_2$).

12. The silver-colored sintered product according to claim 1, wherein the sintered product contains at least one metal impurity from the group comprising Al, Cr, Mn, Fe, Co, Ni, Cu, Zn, Rh, Pd, Cd, Sn, and Sb, the total amount of the metal impurities being not larger than 0.3% by weight of the sintered product.

13. The product of claim 1, prepared by a process comprising the steps:
combining a mixture of a powder of titanium, a powder of a carbide of titanium, and a powder of a boride of titanium,
molding said combination of powders into a predetermined shape; and
firing the molded combination in a non-oxidizing atmosphere at a temperature of about 1300 to 1600° C., such that said boride and carbide phases are formed.

* * * * *